United States Patent [19]

Virly

[11] Patent Number: 4,949,800
[45] Date of Patent: Aug. 21, 1990

[54] TENSIONING DEVICE FOR THE FLEXIBLE OR ARTICULATED ELEMENT OF A TRANSMISSION OR TRAVELLING SYSTEM

[75] Inventor: Patrick Virly, Le Poinconnet, France

[73] Assignee: Colmant Cuvelier, France

[21] Appl. No.: 229,049

[22] Filed: Aug. 5, 1988

[30] Foreign Application Priority Data

Aug. 7, 1987 [FR] France ................... 87 11318

[51] Int. Cl.$^5$ .................................. B62D 55/30
[52] U.S. Cl. ...................... 180/9.21; 305/32
[58] Field of Search ............ 305/10, 15, 29, 31, 305/32, 33; 180/9.21, 9.26

[56] References Cited

U.S. PATENT DOCUMENTS 2,719,062  9/1955  Arps ........................... 305/32 X

FOREIGN PATENT DOCUMENTS

| 91725 | 3/1958 | Norway | 305/31 |
| 0627005 | 10/1978 | U.S.S.R. | 305/32 |
| 0677979 | 8/1979 | U.S.S.R. | 305/31 |
| 0710858 | 1/1980 | U.S.S.R. | 305/30 |
| 1122543 | 11/1984 | U.S.S.R. | 180/9.21 |
| 0925032 | 5/1963 | United Kingdom | 180/9.21 |

Primary Examiner—Russell D. Stormer
Attorney, Agent, or Firm—William A. Drucker

[57] ABSTRACT

A tensioning device is provided for the flexible or articulated element of a transmission or travelling system in which the support of the hub of the wheel tensioning the flexible track is connected to the chassis of the vehicle by links comprising at each end a joint which allows pivoting in all directions. The support is pivotally mounted by a vertical pin to one end of a longitudinal arm whose length can be varied. Thus, by varying the length of said arm, the tension of the track can be adjusted, while said support is suspended by links.

8 Claims, 4 Drawing Sheets

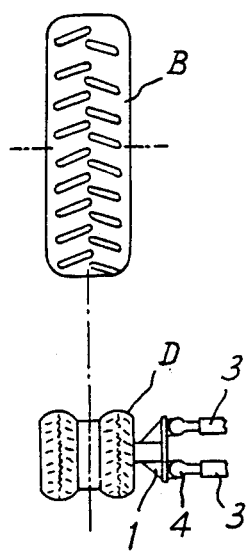
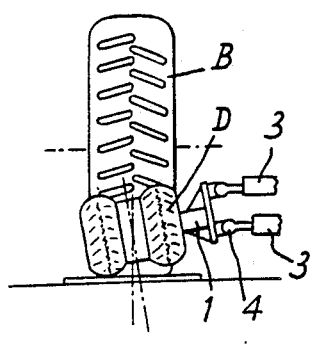
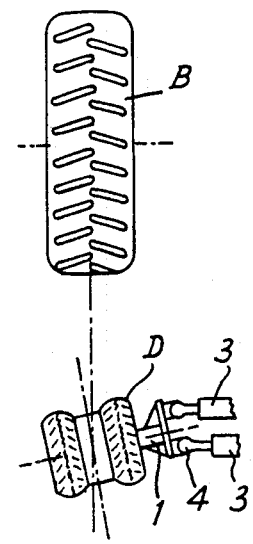
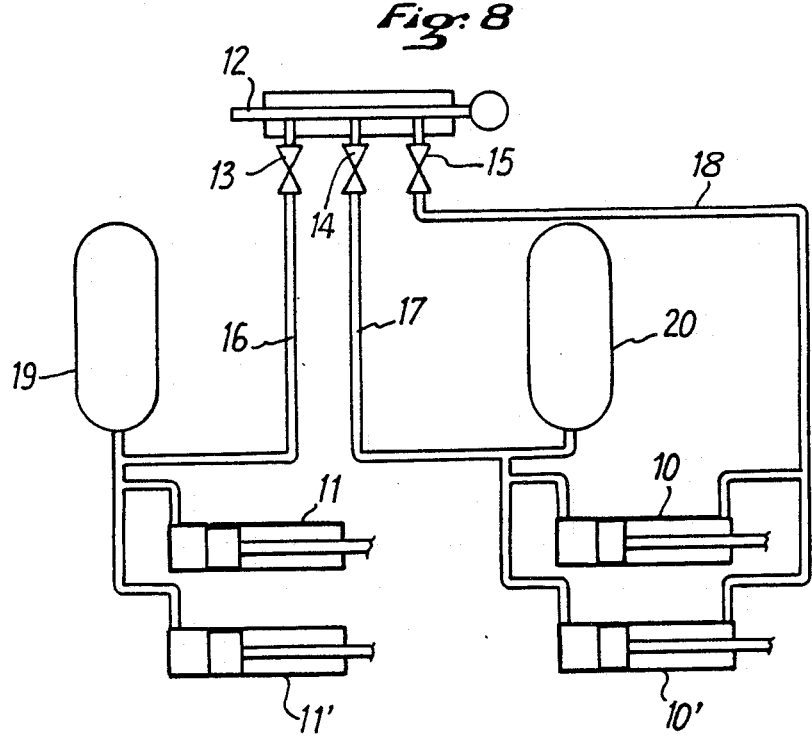

TENSIONING DEVICE FOR THE FLEXIBLE OR ARTICULATED ELEMENT OF A TRANSMISSION OR TRAVELLING SYSTEM

BACKGROUND OF THE INVENTION

1. Field of the Invention

The invention relates to the use on a machine of a non extendible flexible or articulated band of a transmission or travelling system and it relates more particularly to a device ensuring the permanent tension of such a flexible or articulated band, in particular a caterpillar track.

2. Description of the Prior Art

Tensioning devices are known for flexible belts, which comprise a roller designed to engage the belt and which is movable in the plane of the latter. Such tensioning devices are however not applicable for tensioning flexible or articulated tracks in the longitudinal direction equipping different machines and, in particular, the flexible elastomer material tracks equipping the tired wheels of an argicultural tractor.

In fact, in this application, the roller of the tensioning device would be formed by a wheel whose axle would then be carried rigidly by the chassis of the machine which, when the path over which the machine is travelling is not perfectly flat, would prevent the normal movement thereof and would cause damage thereto.

Half-track devices are also known, for example from the U.S. Pat. No. 2,719,062, for tractors in which the structural assembly supporting the tensioning wheels of the track is fixed floatingly at the level of the axle of the driving wheel of the tractor. These devices have different drawbacks such as:

1. A lack of rigidity in the horizontal plane, resulting in poor guidance of the band and considerable risks of the tracks coming off, particularly in bends;

2. The impossibility of correctly and finally adjusting, whatever the conditions of use, the geometry of the tensioning wheels which takes three parameters into account:
   - the alignment, i.e. the coincidence of the longitudinal axis of the driving wheel with that of the tensioning wheels,
   - the set of the axle pin, by slanting the tensioning wheels with respect to the longitudinal vertical plane,
   - the toe-in, by pivoting the tensioning wheels about a vertical axis so as to adjust their front part inwardly.

These three parameters are essential for obtaining correct guidance of the band under all circumstances, in particular when it is a questionof a friction driven band.

3. The transmission of a high force, amplified by the lever arm represented by the length of the floating structure, at the level of the axle casing of the drive wheel, adversely affecting the resistance thereof and making the neighboring mechanical assemblies fragile.

The use of a tensioning device is necessary for example on half track machines such as agricultural tractors in which, with the flexible elastomer material caterpillar track mounted on tired wheels, good friction transmission of the drive force to the track as well as correct load-carrying ability of the track are permanently conditioned by correct tension of the latter.

SUMMARY OF THE INVENTION

An object of the present invention is to overcome the above drawbacks of known tensioning devices and for that it provides a tensioning device of great strength whose tensioning wheel, while ensuring permanent tension in the flexible or articulated element on which it acts, is designed so as to adapt itself to the unevennesses of the ground over which the machine is travelling by providing easy progression of the latter whatever the surface condition of the ground.

According to the invention, the hub of the tensioning wheel of the tensioning device is carried by a support which is fixed to the chassis of the vehicle, in line with the axis of the hub, by a suspension system allowing the support to move in a vertical plane, said support being also fixed to the chassis by a system of variable length allowing the tensioning wheel to move in a horizontal plane so as to permanently provide the tension of the flexible or articulated element.

The suspension system may advantageously be formed of links, which may be of adjustable length, connected at one end to the chassis of the machine for pivoting in all directions and whose other end is connected to the hub support by a pivoting connection also providing movement in all directions, which allow sthe parallelism and the track of the hub to be adjusted with respect to the chassis of the machine, as well as the alignment, the set of the axle pin and the toe-in, while stress means (which may be formed by a spring, a hydraulic cylinder, a torsion bar or any other similar known system) are disposed between the chassis and the hub support. For simplification, in certain applications, these stress means may even be omitted.

The tensioning system, of variable length, may comprise an arm which is connected rigidly or not to one end of the hub support and which is conencted at its other end to the chassis of the machine by a pivoting connection with horizontal axis. In a preferred embodiment, the arm is mounted for pivoting to the hub support by a vertical pin. Stress means (which may be formed by a spring, a hydraulic cylinder, a torsion bar or any other similar known system) are disposed between the chassis of the machine and the hub support, in the direction of the arm, so as to adjustably apply the tensioning wheel against the flexible or articulated band by a horizontal movement of the hub support. The variation of the length of the tensioning system may be obtained by any suitable known means. For example, the arm mounted for pivoting to the hub support may be telescopic or it may have its end suspended from the chassis of the machine by a hinged link so as to form a deformable triangle.

It will be understood that the tensioning device is applicable not only to the use of a flexible track on an agricultural tractor, but also on half tracked or tracked vehicles. It will also be understood that the tensioning wheel, whose hub is carried by the device of the invention may be single or double and may be formed by a tired wheel, by a roller made from rubber or not or by a drive sprocket wheel. Through the design of the tensioning wheel it may be raised for passing over obstacles or it may be adjusted as required by the mode of use or else removed.

It will also be noted that, in accordance with the invention, a drive system may be associated with the support of the hub of the tensioning wheel, via an appropriate transmission member such as a universal joint for example.

It will also be understood that the tensioning device of the invention may, depending on the desired application, take up any appropriate position in the tracked train.

It will be noted that, by using a hydraulic cylinder as stress means for the suspension system on each side of the tractor, a system may be obtained for self-adjustment of the suspension by connecting the corresponding chambers of the two hydraulic cylinders together. By using sensors or any other appropriate means taking into account the equilibrium of the machine, of the attachment or of any other additional load, regulation of the suspension may also be provided.

Finally, without departing from the scope of the invention, the tensioning device could more generally be applied in a kinematic chain comprising a chain, band or belt transmission.

BRIEF DESCRIPTION OF THE DRAWINGS

For a better understanding of the device of the invention, a preferred embodiment thereof will be described hereafter by way of exmple, with reference to the accompanying schematic drawings in which:

FIGS. 5 to 7 are diagrams showing the adjustment, for the tensioning wheel, of the alignment, of the set of the axle pin and of the toe-in respectively, FIGS. 5 and 7 being plan views whereas FIG. 6 is an elevational view; and FIG. 8 is a diagram of the hydraulic stress circuits associated with the tensioning and suspension means.

DESCRIPTION OF THE PREFERRED EMBODIMENT

Figure 1:
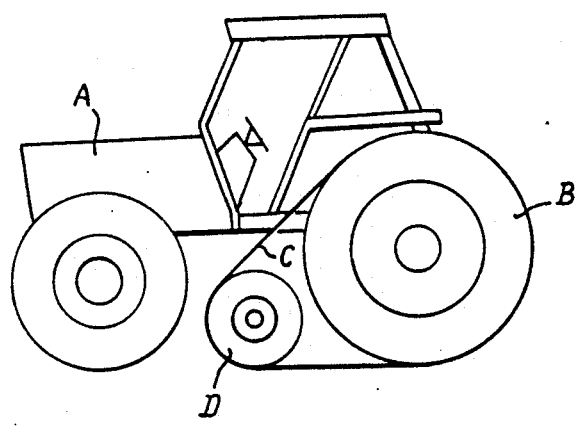
FIG. 1 is a profile view of an agricultural tractor equipped at the rear with a flexible track.
Figure 2:
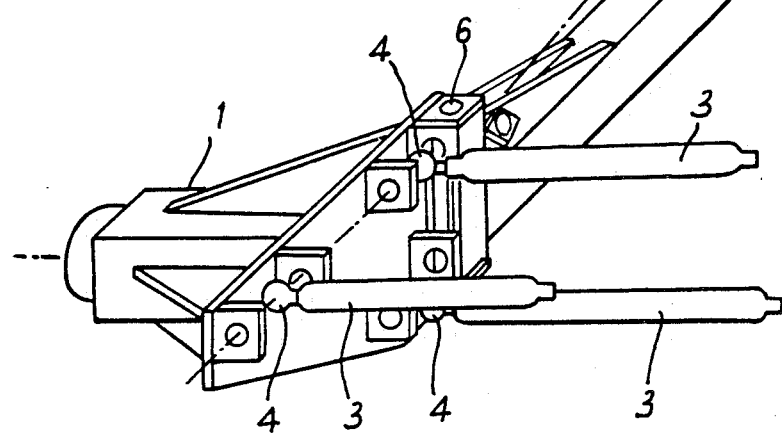
FIG. 2 is a perspective view of the support device for the hub of the wheel providing the tension of the flexible track of FIG. 1.
Figure 3:
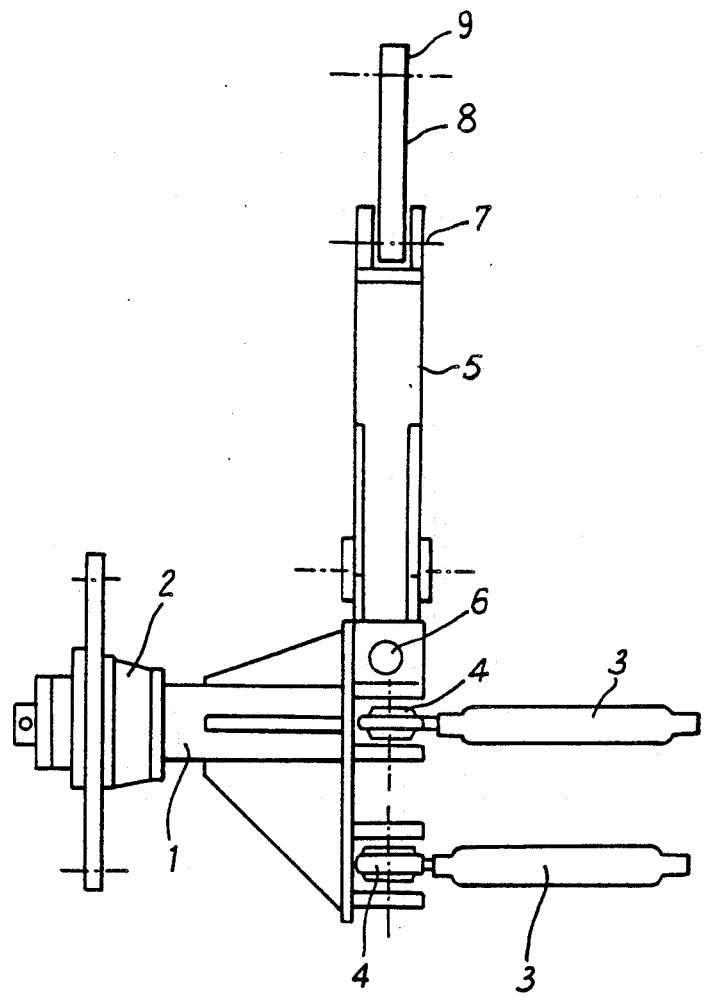
FIG. 3 is a plan view of the device of FIG. 2.
Figure 4:
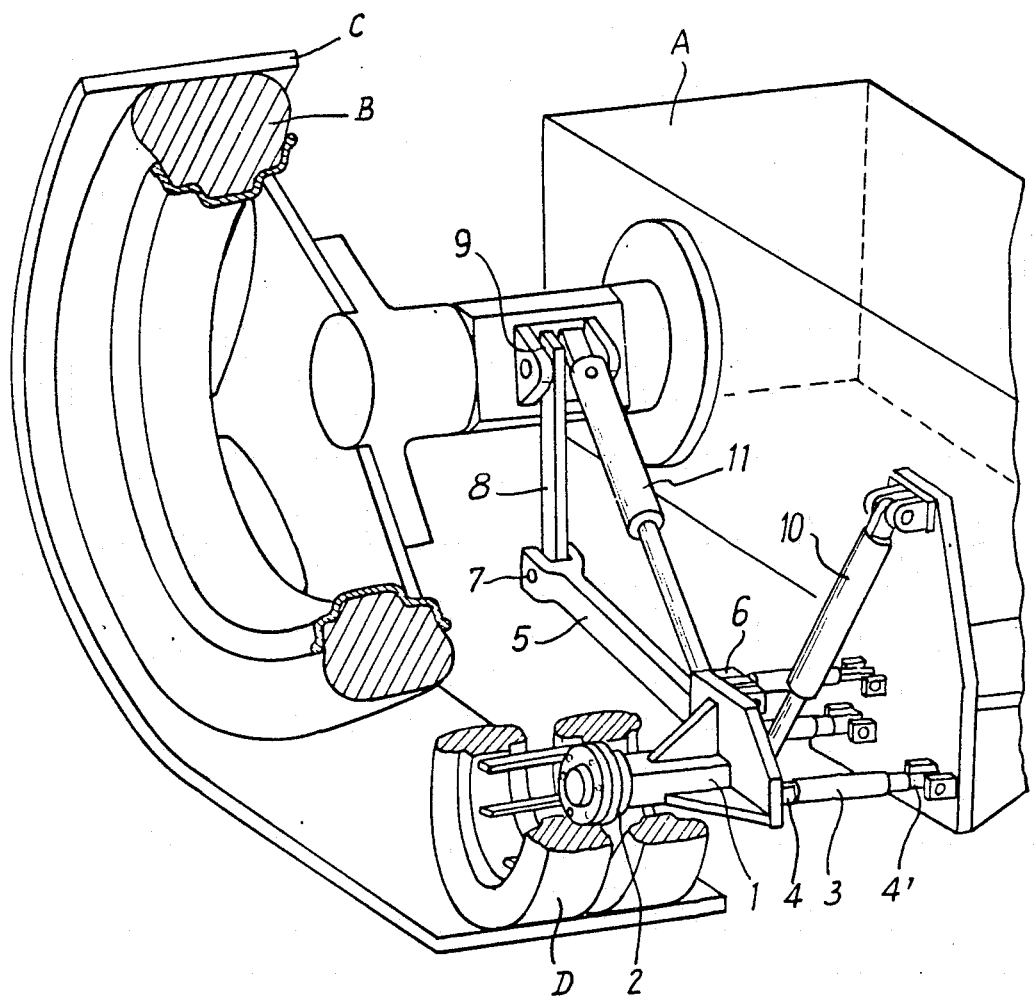
FIG. 4 is a partial perspective view of the device of FIGS. 2 and 3.

In FIG. 1 an agricultural tractor has been shown at A whose rear tired wheel B is equipped with a flexible track C made from elastomer material whose tension is provided by a tired wheel D of smaller diameter. Referring to FIGS. 2 to 4, a support has been shown at 1 for the hub 2 of wheel D, which is in the form of a twin wheel. Support 1 is supported and guided by three links 3, of adjustable length, each having one end which cooperates with support 1 through a ball joint 4, whereas their opposite ends are mounted for pivoting to the chassis of machine A, in line with the axis of hub 2, also by ball joints 4'. A stress system, formed in the example shown by a double acting hydraulic cylinder 10, is disposed between the chassis and the support 1 of hub 2 so as to provide the suspension which is obtained by the vertical movement of support 1.

The equilibrium of hub 2 about its axis is maintained by an arm 5 which is pivotally connected, at one end, to the support 1 of hub 2 by means of a vertical pin 6. The opposite end of arm 5 is connected, for pivoting about a horizontal pin 7, to one end of a link 8 whose other end 9 is pivotally connected by a horizontal pin to the chassis of machine A. The tension of the track is obtained by the horizontal movement of support 1 of hub 2, which is caused by actuating a double acting hydraulic cylinder 11 disposed so as to form the third side of the deformable triangle formed by arm 5 and link 8.

The arrangement of links 3 and of the hydraulic cylinder 10 makes possible the adjustment of the parallelism and of the track of hub 2 of the tensioning wheel D. This arrangement also makes possible the adjustment of the alignment of the longitudinal axis of the drive wheel B of the tractor with that of the tesnioning wheel 2 (see FIG. 5), the adjustment of the set of the axle pin by slanting the tensioning wheel 2 with respect to the longitudinal vertical plane (see FIG. 6) and adjustment of the toe-in by adjusting the front of the tensioning wheels closer to the chassis of the machine (see FIG. 7).

It will be understood that the tensioning wheel device D has been described as shown for one side of the tractor, but that this tractor is equipped on the other side, symmetrically with respect to the vertical plane passing through the longitudinal axis of the tractor, with an identical device.

In FIG. 8, the hydraulic circuit has been shown for actuating the tensioning and suspension systems on both sides of the tractor. An oil intake 12 is connected, through valves 13, 14, 15 respectively, to supply ducts 16, 17, 18. Duct 16 is connected to the piston side chambers of the hydraulic cylinder 11, 11' controlling the tension of the belt on each side of the tractor. Duct 16 is also connected to an oleopneumatic accumultor 19, forming a closed hydraulic circuit which ensures the constant pressure tension for the belt on each side of the tractor.

Duct 18 is connected to the rod side chamber of each of the hydraulic cylinders 10, 10' controlling the suspension on each side of the tractor, whereas duct 17 is connected to the piston side chamber of each of these two hydraulic cylinders as well as to an oleopneumatic accumulator 20. The closed circuit formed by ducts 17, 18 ensures the suspension and raising if required at constant pressure, as well as maintaining the tensioning wheels at a given altitude.

It will be understood that the tensioning and suspension systems of the invention, and more generally the load-carrying device may be regulated at any time, separately not only at the left or right but also at the front or at the rear, by using sensors or any other appropriate means taking into account the equilibrium of the machine, of the attachment, or of any other additional load carried or drawn, as well as the condition or nature of the ground.

Such regulation may be obtained not only by an independent system but also by using the means proper to the machine (on-board hydraulic unit or computer for example), these latter being themselves possibly remote controlled.

It will be readily understood that the above description has been given simply by way of example without any limitative character, and that additions or constructional modifications may be made thereto without departing from the scope and spirit of the invention defined by the following claims. It will in particular be understood that the device has been described with respect to an agricultural tractor but that, without departing from the scope of the invention, it could be applied to any other tracked or half-tracked vehicle using this technology.

What I claim is:

1. A tensioning device for a flexible or articulated element of a transmission or travelling system equipping each side of a machine provided with a rear wheel axle, which comprises:
   (a) at least one tensioning wheel engaging said element,
   (b) a support rigid with the hub of the tensioning wheel, (c) connecting means between said support and a fixed member carried by the chassis of the machine at the level of said rear wheel axle thereof, said connecting means allowing said support to move in a plane parallel to the longitudinal axis of the machine to vary tensioning of the element, (d) an articulated suspension system connecting said support and said chassis, in line with the hub of the tensioning wheel, allowing the tensioning wheel to move in a vertical plane, said articulated suspension system comprising links transversely disposed in relation to the longitudinal axis of the machine, each of said links being pivotally connected at one end to the chassis of the machine so as to be able to pivot in all directions and at the other end to the support by a joint allowing pivoting in all directions, and (e) resilient stress means transversely disposed between said support and the chassis of the machine, in line with the hub of the tensioning wheel, for urging said tensioning wheel towards the ground.

2. The tensioning device as claimed in claim 1 wherein said connecting means comprise an arm connected at one end to the support by a vertical pin and at its other end to the member carried by the chassis of the machine by a pivot joint with horizontal axis, a stress member connecting said member carried by the chassis to the support so as to apply the tensioning wheel against the element.

3. The tensioning device as claimed in claim 2 wherein said arm is connected to the member carried by the chassis of the machine by means of an articulated link so as to form a deformable triangle.

4. The tensioning device as claimed in claim 2 wherein said resilient stress means of said articulated suspension system is formed by a double-acting hydraulic cylinder and said stress member is formed by a single-acting hydraulic cylinder, each of these two cylinders being fed from a constant pressure hydraulic circuit comprising an oleopneumatic accumulator.

5. A machine comprising on each side a tensioning device as claimed in claim 4, supply ducts of the hydraulic cylinders of the articulated suspension system on both sides of the machine being connected together and supply ducts of the hydraulic cylinders of the stress members on both sides of the machine being connected together.

6. The tensioning device as claimed in claim 2 wherein said stress member is formed by hydraulic components.

7. The tensioning device as claimed in claim 1 wherein said resilient stress means are formed by hydraulic components.

8. The tensioning device as claimed in claim 1 wherein the connection between said arm and the support is formed by a pivot joint with vertical axis.

* * * * *